US006212240B1

United States Patent
Scheibel, Jr. et al.

(10) Patent No.: US 6,212,240 B1
(45) Date of Patent: Apr. 3, 2001

(54) METHOD AND APPARATUS FOR CONVEYING DATA BETWEEN COMMUNICATION DEVICES

(75) Inventors: Robert C. Scheibel, Jr., Elmhurst; Robert F. Boxall, Morton Grove, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/106,673

(22) Filed: Jun. 24, 1998

(51) Int. Cl.[7] ........................................ H04L 5/12
(52) U.S. Cl. ...................... 375/261; 370/468; 714/18; 714/748; 714/749
(58) Field of Search .................. 375/261, 324, 375/225; 370/465; 11/468; 714/18, 748, 749, 704, 819

(56) References Cited

U.S. PATENT DOCUMENTS

| | | | |
|---|---|---|---|
| 5,553,083 | * 9/1996 | Miller | 371/32 |
| 5,680,322 | * 10/1997 | Shinoda | 364/514 |
| 5,768,528 | * 6/1998 | Stumm | 395/200.61 |
| 5,793,744 | * 8/1998 | Kanerva et al. | 370/209 |
| 5,815,508 | * 9/1998 | Wadzinske et al. | 371/5.1 |

OTHER PUBLICATIONS

Theresa A. Fry, C. C. Lee, and Michael Honig, "Data Capacity of TDMA/FDMA Systems with Adaptive Modulation", IEEE Proceedings 48th Vehicular Technology Conference, Apr. 1998, pp. 929–933.

\* cited by examiner

*Primary Examiner*—Stephen Chin
*Assistant Examiner*—Mohammad Ghayour
(74) *Attorney, Agent, or Firm*—Daniel C. Crilly; Jeffrey K. Jacobs

(57) ABSTRACT

A first communication device (107) transmits user data (102), divided into a plurality of data blocks, at a first modulation rate. The first communication device (107) then receives an acknowledgment (104) from the second communication device (101) indicating a quantity of the data blocks that were not received and compares this quantity to a threshold. When the quantity is less than the threshold, the data blocks that were not received are retransmitted (106) at a second, usually lower, modulation rate. Otherwise, they are retransmitted at the first modulation rate. A comparison between the quantity of data blocks to be retransmitted and a threshold is being introduced to known communication techniques by the present invention.

17 Claims, 2 Drawing Sheets

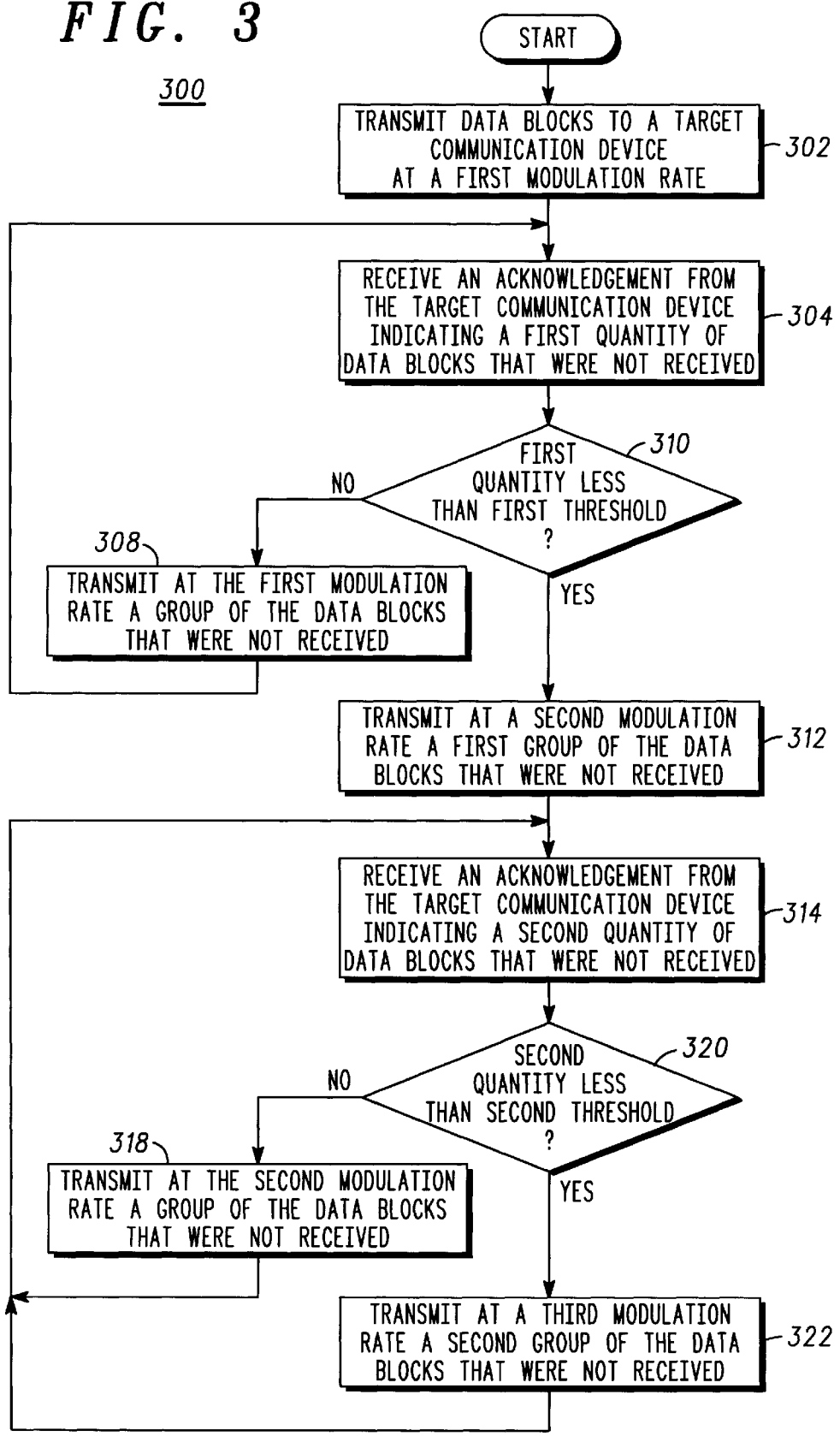

METHOD AND APPARATUS FOR CONVEYING DATA BETWEEN COMMUNICATION DEVICES

FIELD OF THE INVENTION

The present invention relates generally to communication devices and, in particular, to conveying data between communication devices, while efficiently using the communication bandwidth.

BACKGROUND OF THE INVENTION

Many communication protocols exist and are known for conveying data between communication devices. Many of these protocols address the problem of data corruption which can occur during any data communication. In wireless communication systems, for example, the problems of data corruption are particularly acute. In such systems, automatic repeat request (ARQ) protocols are often used in order to achieve some level of reliable data transfer. In ARQ protocols, when corrupted data is received, the receiving device requests the sending device to resend the corrupted data. For instance, a sending device sends a stream of data divided into data blocks to a receiving device. Through error detection coding, the receiving device may detect that the data in some of the data blocks has been corrupted. When such corruption is detected, the receiving device then responds with an acknowledgment (ACK) that indicates which of the data blocks were corrupted. The sending device may then resend the corrupted data blocks in an attempt to successfully convey the data.

Merely resending the data, however, may not be enough. In the article "Data Capacity of TDMA/FDMA Systems with Adaptive Modulation", the technique of resending corrupted data at a reduced data rate is discussed. Reducing the data rate may enable the receiving device to correctly distinguish the data from background noise or interference, thereby increasing the likelihood of a successful data transfer. In such a protocol, the receiving device indicates in its ACK which data blocks contain corrupted data. The corrupted data blocks are then resent by the sending device at a lower data rate. If some of the resent data blocks are still corrupted, such data blocks are resent at yet a lower data rate. This technique of reducing the data rate continues until all the data is successfully transferred or a minimum data rate is reached. By reducing the data rate only when data corruption occurs, these rate reduction protocols attempt to use as little communication bandwidth as is necessary to successfully and expediently transfer data.

One problem with a rate reduction data protocol, is the use of too much communication bandwidth in certain situations. In a wireless communication system, for instance, a number of subscribers approaching the edge of a coverage area may be communicating on very poor quality channels. Use of the above described rate reduction protocol between the subscribers and the communication system infrastructure may quickly result in many transmissions at the lowest data rate. Thus, to transmit the same amount of data as subscribers communicating on high quality channels, the subscribers communicating on low quality channels consume much more transmission time, due to transmitting at a lower data rate, and thereby utilize a greater portion of the available bandwidth. With a number of such subscribers utilizing a greater and greater portion of the bandwidth, less and less bandwidth is available for the rest of the subscribers. The overall performance of the communication system suffers since a greater portion of the available bandwidth is being utilized for lower data rate transmissions.

Therefore, a need exists for a method and apparatus of conveying data reliably, while utilizing bandwidth more efficiently.

BRIEF DESCRIPTION OF THE DRAWINGS

FIG. 3 illustrates a logic flow diagram of steps executed by a communication device to convey data in accordance with a preferred embodiment of the present invention.

DESCRIPTION OF A PREFERRED EMBODIMENT

Generally, the present invention provides a method and apparatus for conveying data between communication devices. A first communication device transmits user data to a second communication device at a first modulation rate, wherein the user data is divided into a plurality of data blocks. The first communication device then receives an acknowledgment from the second communication device indicating a quantity of the data blocks that were not received and compares this quantity to a threshold. When the quantity is less than the threshold, the data blocks that were not received are retransmitted at a second modulation rate that is preferably lower than the first modulation rate. Otherwise, the data blocks that were not received are retransmitted at the first modulation rate. By conveying data in this manner, the present invention uses a lower modulation rate for retransmission only when the quantity of data blocks to be retransmitted is such that retransmission at a lower modulation rate does not result in inefficient use of the radio frequency (RF) channel bandwidth.

Figure 1:
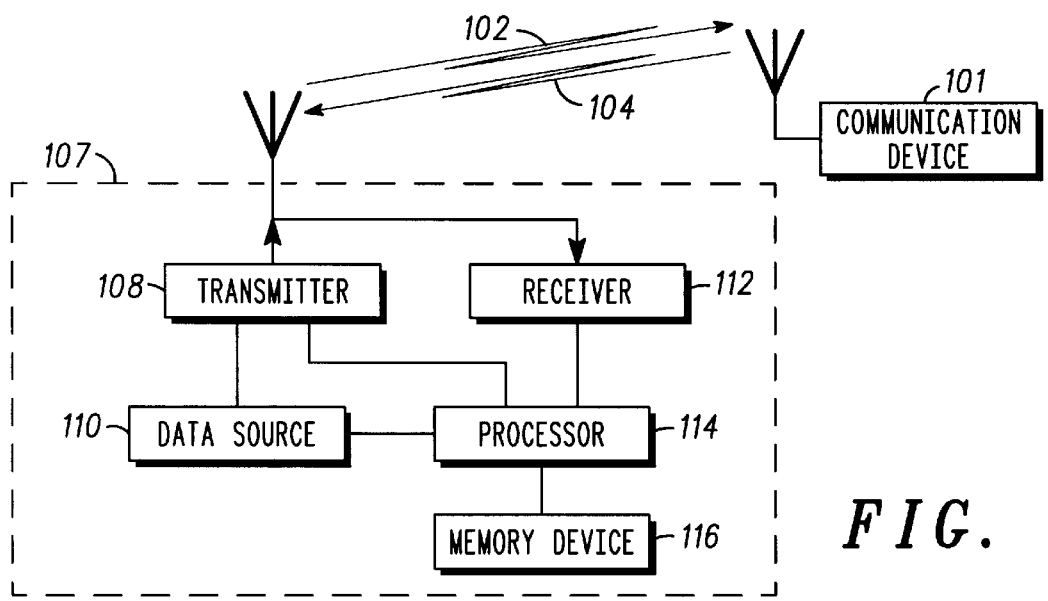
FIG. 1 illustrates a block diagram depiction of two communication devices in accordance with a preferred embodiment of the present invention.
Figure 2:
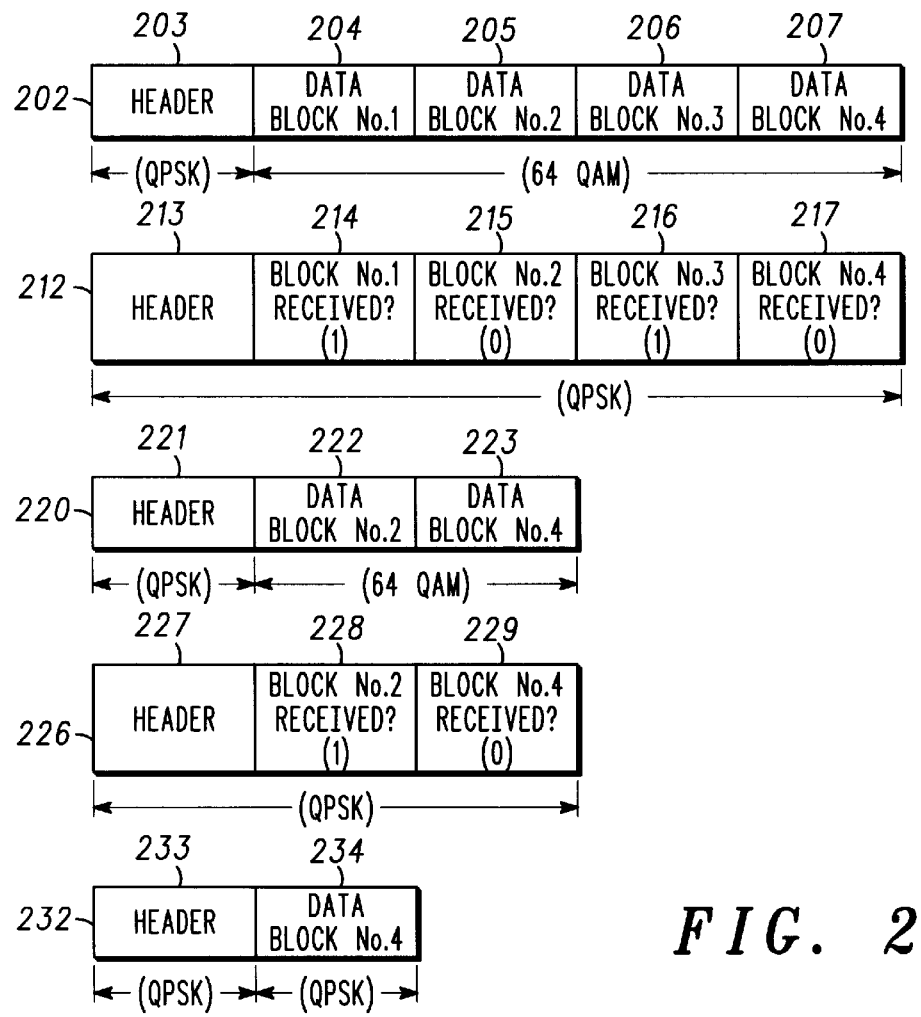
FIG. 2 illustrates a block diagram depiction of messages exchanged by two communication devices in accordance with a preferred embodiment of the present invention.

The present invention can be more fully understood with reference to FIGS. 1–3. FIG. 1 illustrates a block diagram depiction of two communication devices 101, 107 in accordance with a preferred embodiment of the present invention. Each communication device 101, 107 comprises a memory device 116, a data source 110, a transmitter 108, a receiver 112, and a processor 114. The transmitter 108 preferably comprises well-known circuitry and software such as that used in amplifiers, modulators, up converters, and filters. The receiver 112 preferably comprises well-known circuitry and software such as that used in amplifiers, demodulators, down converters, and filters. The data source 110 is the source of the user data to be transmitted and preferably comprises a random access memory. The memory device 116 is the source of selectable modulation rates and preferably comprises a random access memory, although a read-only memory device could be used alternatively. The processor 114 preferably comprises a microprocessor. Either or both of the two communication devices 101, 107 could be a mobile or portable radio communication unit or a data controller such as the Motorola Data Gateway (MDG) that is commercially available from Motorola, Inc. of Schaumburg, Illinois.

Operation of the two preferred communication devices 101, 107 occurs substantially as follows in accordance with the present invention. The data source 110 of the sending communication device 107 provides the user data, which might comprise a text file or large data file, divided into data blocks for transmission to the target communication device 101. Each data block preferably comprises an amount of data that fits into a 15 millisecond time slot of a time division multiple access (TDMA) time frame. In an alternative embodiment, the data source 110 provides the user data to the processor 114, and the processor 114 divides the user data into data blocks using known techniques. Once the user data is divided into data blocks, the data source 110 or the processor 114 provides the data blocks to transmitter 108, and the transmitter 108 transmits the user data at a first modulation rate to the target device 101 via a radio communication resource 102, such as one or more TDMA time slots.

Upon receiving the transmission, the target communication device 101 determines whether it received all the data blocks of user data contained in the transmission and whether any received data blocks were corrupted. Data blocks that were either not received or were improperly received due to corruption are collectively referred to as unreceived data blocks herein. The target device 101 then transmits an acknowledgment to the sending device 107 via a radio communication resource 104, wherein the acknowledgment indicates a quantity of data blocks that were not received by the target communication device 101. Preferably, the acknowledgment also identifies which of the transmitted data blocks were not received by the target communication device 101. The receiver 112 then receives the acknowledgment from the target communication device 101.

The processor 114 compares the quantity indicated by the acknowledgment to a threshold. When the quantity of unreceived data blocks is less than the threshold, the processor 114 provides a control signal to the transmitter 108 instructing the transmitter 108 to retransmit the unreceived data blocks at a second modulation rate that is less than the first modulation rate. The processor 114 selects the appropriate modulation rate from a table of modulation rates stored in the memory device 116. The transmitter 108 then retransmits the unreceived data blocks at a second modulation rate, via communication resource 102, responsive to the control signal. When the quantity of unreceived data blocks is not less than the threshold the unreceived data blocks are retransmitted at the first modulation rate.

In the preferred embodiment, the first modulation rate comprises 64-ary quadrature amplitude modulation (QAM) and the second modulation rate comprises 16-ary QAM. In an alternate embodiment, the first modulation rate may be 16-ary QAM and the second modulation rate 4-ary QAM or quaternary phase shift keying (QPSK). One of ordinary skill in the art will recognize that the first modulation rate requires less bandwidth than the second modulation rate to transmit an equivalent amount of data because the first modulation rate is preferably greater than the second modulation rate. By reducing the modulation rate only when the quantity of data blocks to be resent is less than the threshold, the present invention efficiently allocates the RF bandwidth for transmissions and retransmissions of user data.

FIG. 2 illustrates a block diagram depiction of messages exchanged by two communication devices in accordance with a preferred embodiment of the present invention. Message 202 comprises a message header 203 and four data blocks 204–207. Message 202 represents an exemplary datagram message or data packet transmitted to a target communication device in order to convey some user data to the target communication device. The user data to be conveyed by message 202 is divided into data blocks resulting in data blocks 204–207. Preferably each of the data blocks 204–207 include a cyclic redundancy check (CRC) used to determine whether the data block was correctly received at the target communication device. Preferably, the message header 203 comprises control information, related to the data message and the overall data transmission, such as the number of data blocks contained in the message 202, the message type, identification of the sending communication device, identification of the target communication device, a protocol sequencing number for the message 202, the protocol sequencing number of the last message received from the target communication device, and the modulation rate at which the data blocks 204–207 will be transmitted. The message header 203 is preferably transmitted to the target communication device using a QPSK modulation, and the data blocks 204–207 are preferably transmitted to the target communication device using 64-ary QAM. Since the header control information is important to processing the message 202 and is relatively short, the message header 203 is always transmitted at the lowest modulation rate, in the preferred embodiment, to maximize the likelihood of successful transfer of the control information. On the other hand, the data blocks 204–207 are generally much larger than the control information; thus, they are transmitted at the higher data rates, at least initially, to minimize bandwidth consumption.

Upon receiving data message 202, the target communication device responds with an acknowledgment message 212. Similar to the message header 203 of data message 202, the acknowledgment message 212 is preferably transmitted at the lowest modulation rate (e.g. using QPSK modulation) to maximize the likelihood of successful transfer. ACK message 212 comprises a message header 213 and a bitmap containing four bit positions 214–217. The ACK message header 213 includes the same type of control information as message header 203 and additionally includes an indication of whether a bitmap is included with the message header 213. The bit positions 214–217 correspond to the data blocks 204–207 of message 202, respectively. Preferably, a binary one in a given bit position of an acknowledgment message bitmap indicates that the target device received the data block which corresponds to that bit position. Analogously, a binary zero in a given bit position indicates that the target device did not receive the corresponding data block. ACK message 212 indicates to the sending communication device that data blocks 205 and 207 were not received by the target communication device. ACK message 212 also indicates, although not explicitly, the quantity of data blocks not received. The quantity of data blocks that were not received can be determined by counting the binary zeros contained in the bitmap of the ACK message 212. Such a count in the present case results in a quantity of two data blocks not received.

Responsive to receiving acknowledgment message 212, the sending communication device 101 generates a new datagram message 220. Data message 220 comprises a message header 221 and two data blocks, the data blocks 222, 223 comprise the data blocks 205, 207 indicated by the ACK message 212 as not being received by the target device. Message header 221 comprises the same type of control information as message header 203 and additionally a retry bitmap which indicates the position held by each of the data blocks being retransmitted with respect to data message 202. The retry bitmap of data message 220 would therefore contain "0101" indicating that data block 222 corresponds to the second data block in data message 202, i.e. data block 205, and that that data block 223 corresponds to the forth data block in data message 202, i.e. data block 207. Prior to transmitting data message 220 the sending device compares the quantity of data blocks being retransmitted (two in this case) to a threshold (e.g., 81). Since the quantity of data blocks being retransmitted in this case is less than the threshold, the data blocks are retransmitted at a lower modulation rate than that at which they were originally transmitted to increase the likelihood of their being received by the target communication device. In the preferred embodiment, the unreceived data blocks 205, 207 are transmitted using 16-ary QAM.

Upon receiving data message 220, the target communication device responds with another acknowledgment message 226. ACK message 226 comprises a message header 227 and a bitmap. The bitmap in this case contains two bit positions 228, 229 corresponding to data blocks 222, 223, respectively. Acknowledgment message 226 indicates that one data block (data block 223) was not received by the target communication device. Therefore, the data contained in data block 223 must be resent to the target communication device.

The sending device retransmits data block 223 (i.e., original data block 207) to the target device via datagram message 232. Data message 232, similar to data message 220, comprises a message header 233 and user data (data block 234, in this case). Prior to transmitting data message 232 the sending device compares the quantity of data blocks being retransmitted (one in this case) to a threshold (e.g., 40). Since the quantity of data blocks being retransmitted in this case is less than the threshold, the data blocks are retransmitted at a lower modulation rate than that at which they were originally transmitted to increase the likelihood of their being received by the target communication device. In the preferred embodiment, the unreceived data block 223 is retransmitted as data block 234 using QPSK modulation.

FIG. 3 illustrates a logic flow diagram 300 of steps executed by a first or sending communication device to convey data to second or target communication device in accordance with a preferred embodiment of the present invention. The logic flow begins when the sending communication device transmits (302) a first data packet to the target communication device at a first modulation rate (e.g., 64-ary QAM), wherein the first data packet includes data blocks. In the preferred embodiment, the sending communication device also transmits control information to the target communication device at a lower modulation rate (e.g., QPSK) than the rate of the first data packet transmission. As described above, the control information indicates, among other things, the first modulation rate.

The sending communication device then receives (304) an acknowledgment from the target communication device indicating a quantity of data blocks that were not received. In the preferred embodiment, the acknowledgment further identifies the data blocks that were not received. Such identification is accomplished via a bit map as described above. The sending communication device compares (310) the quantity of unreceived data blocks to a first threshold. Thresholds are established to place a limit on the amount of data that can be retransmitted at a lower modulation rate. Because a transmission of data requires more of the available bandwidth when transmitted at a lower modulation rate, such a limit on the amount of data that can be retransmitted at a lower modulation rate effectively limits the amount of available bandwidth used for the retransmission. In the present invention, thresholds limit the disproportionate share of communication bandwidth that communication devices, transferring data on poor quality channels, are allowed to use.

When the quantity of unreceived data blocks is less than the first threshold, the sending communication device transmits (312), at a second modulation rate, a first group of the data blocks that were not received. In the preferred embodiment, the second modulation rate (e.g., 16-ary QAM) is a lower modulation rate than the first modulation rate and the first group of data blocks consists of all the data blocks that were not received. Also in the preferred embodiment, the first threshold is 81 while the maximum number of data blocks that is ever transmitted in one datagram is 80. Thus, since the quantity of unreceived data blocks will always be less than the first threshold, the first group of data blocks will always be retransmitted at the second modulation rate. As described above with respect to FIG. 2, control information (e.g., a header) preferably accompanies the first group of data blocks in the transmission of block 312. The control information is preferably conveyed at the lowest system modulation rate (e.g., QPSK) to increase the likelihood that the target communication device will receive the control information.

Subsequent to transmitting the first group of unreceived data blocks at the second modulation rate, the sending communication device receives (314) another acknowledgment from the target communication device indicating a second quantity of data blocks that were not received. The sending device compares (320) the second quantity of unreceived data blocks to a second threshold and, when the second quantity of unreceived data blocks is less than the second threshold, transmits (322) at a third modulation rate (e.g., QPSK) a second group of the unreceived data blocks. The second group of unreceived data blocks is effectively a subset of the first group since the second group contains only those data blocks from the first group which were not received when the first group was transmitted. In the preferred embodiment, the second threshold is selected to limit the size of the retransmissions at the third modulation rate (e.g., QPSK). The second threshold is set to 40 in the preferred embodiment to prevent 40 or more data blocks from being transmitted using QPSK modulation, an inefficient use of the RF bandwidth. The value 40 is selected also because it is large enough to only impact retransmissions by those communication devices communicating on poor quality channels.

When the second quantity of unreceived data blocks is greater than or equal to the second threshold, the sending communication device transmits (318) at the second modulation rate, the second group of unreceived data blocks. Once the second group of unreceived data blocks have been transmitted, the logic flow continues at block 314. In the preferred embodiment, the first modulation rate is greater than the second modulation rate and the second modulation rate is greater than the third modulation rate.

When the quantity of unreceived data blocks is greater than or equal to the first threshold, the sending communication device transmits (308), at the first modulation rate, the first group of unreceived data blocks to the target communication device and the logic flow continues at block 304. In other words, the modulation rate is not changed for the retransmission of data blocks if the quantity of data blocks to be retransmitted is not less than the threshold. Thus, if a modulation rate reduction occurs upon the first retransmission of data blocks, then such a modulation rate reduction continues to occur upon each subsequent retransmission until a minimum modulation rate is attained. In the preferred embodiment, only two modulation rate reductions occur (i.e., from 64-ary QAM to 16-ary QAM and from 16-ary QAM to QPSK) and all data blocks retransmitted as part of or after the second retransmission attempt are transmitted using the modulation rate (i.e. QPSK) corresponding to the second modulation rate reduction.

Although described above with respect to only three modulation rates, the method of the present invention can be performed iteratively with any number of available modulation rates, as it is in the preferred embodiment. When applied iteratively in this manner, each modulation rate, except the maximum, has an associated threshold which the user may set to limit the amount of data retransmitted at a lower modulation rate, thereby more efficiently utilizing communication bandwidth.

The present invention encompasses a method and apparatus for conveying data from a first communication device to a second communication device. With this invention reliable data communication can occur without inefficient use of communication channels. In the prior art, unreceived data is retransmitted at lower and lower modulation rates until either the data is received or some minimum modulation rate is reached. In the present invention, however, unreceived data is retransmitted at a lower modulation rate only when the amount of data to retransmit is below an established threshold. When the amount of data to retransmit is not below an established threshold, the data is retransmitted at the same modulation rate at which it was last transmitted. By not reducing the modulation rate when a large amount of data is being resent, the allocation of available bandwidth can be limited and kept within what are defined to be efficient utilization boundaries for a communication system.

While the present invention has been particularly shown and described with reference to particular embodiments thereof, it will be understood by those skilled in the art that various changes in form and details may be made therein without departing from the spirit and scope of the present invention.

We claim:

1. A method for a first communication device to convey data to a second communication device, the method comprising the steps of:

transmitting user data to the second communication device at a first modulation rate of a plurality of modulation rates, the user data being divided into a plurality of data blocks;

receiving an acknowledgment from the second communication device indicating a quantity of data blocks that were not received;

comparing the quantity to a threshold;

when the quantity is greater than or equal to the threshold, transmitting at the first modulation rate the data blocks that were not received; and when the quantity is less than the threshold, transmitting at a second modulation rate of the plurality of modulation rates the data blocks that were not received.

2. The method of claim 1, wherein the first modulation rate is 64-ary quadrature amplitude modulation and the second modulation rate is 16-ary quadrature amplitude modulation.

3. The method of claim 1, wherein the first modulation rate is 16-ary quadrature amplitude modulation and the second modulation rate is 4-ary quadrature amplitude modulation.

4. The method of claim 3, wherein the second modulation rate is quaternary phase shift keying.

5. The method of claim 1, wherein the acknowledgment further identifies the data blocks that were not received.

6. The method of claim 1, further comprising the step of transmitting control information to the second communication device at a third modulation rate of the plurality of modulation rates, wherein the control information indicates the first modulation rate.

7. The method of claim 6, wherein the first modulation rate is greater than the second modulation rate and wherein the second modulation rate is greater than the third modulation rate.

8. The method of claim 1, wherein the step of transmitting at a second modulation rate the data blocks that were not received further comprises the step of transmitting control information to the second communication device at a third modulation rate of the plurality of modulation rates, wherein the control information indicates the second modulation rate.

9. A method for a first communication device to convey data to a second communication device, the method comprising the steps of:

transmitting a first data packet to the second communication device at a first modulation rate of a plurality of modulation rates, the first data packet including a plurality of data blocks;

receiving a first acknowledgment from the second communication device indicating a first quantity of data blocks that were not received;

comparing the first quantity to a first threshold;

when the first quantity is less than the first threshold, transmitting at a second modulation rate a first group of the data blocks that were not received;

receiving a second acknowledgment from the second communication device indicating a second quantity of data blocks that were not received;

comparing the second quantity to a second threshold;

when the second quantity is greater than or equal to the second threshold, transmitting at the second modulation rate a second group of the data blocks that were not received; and when the second quantity is less than the second threshold, transmitting at a third modulation rate the second group of the data blocks that were not received.

10. The method of claim 9, further comprising the step of:

when the first quantity is greater than or equal to the first threshold, transmitting at the first modulation rate the first group of the data blocks that were not received.

11. The method of claim 9, wherein the first modulation rate is 64-ary quadrature amplitude modulation, wherein the second modulation rate is 16-ary quadrature amplitude modulation, and wherein the third modulation rate is 4-ary quadrature amplitude modulation.

12. A communication device for conveying data, the communication device comprising:

a memory device having stored therein a plurality of modulation rates;

a data source that provides user data divided into a plurality of data blocks;

a transmitter, coupled to the data source, that transmits the user data at a first modulation rate and that retransmits a group of the plurality of data blocks at a second modulation rate responsive to a control signal;

a receiver that receives an acknowledgment from a target communication device, the acknowledgment indicating a quantity of data blocks that were not received by the target communication device; and a processor, coupled to the memory device, the data source, the transmitter, and the receiver, that compares the quantity indicated by the acknowledgment to a threshold and, when the quantity is less than the threshold, provides the control signal to the transmitter instructing the transmitter to retransmit the group of the plurality of data blocks at the second modulation rate.

13. The communication device of claim 12, wherein the communication device is a mobile or portable radio communication unit.

14. The communication device of claim 12, wherein the communication device is a data controller.

15. The communication device of claim 12, wherein the first modulation rate is 64-ary quadrature amplitude modulation and the second modulation rate is 16-ary quadrature amplitude modulation.

16. The communication device of claim 12, wherein the first modulation rate is 16-ary quadrature amplitude modulation and the second modulation rate is 4-ary quadrature amplitude modulation.

17. The communication device of claim 16, wherein the second modulation rate is quaternary phase shift keying.

\* \* \* \* \*